(12) United States Patent
Kamil Amin et al.

(10) Patent No.: US 10,317,547 B2
(45) Date of Patent: Jun. 11, 2019

(54) NOISE MODEL ESTIMATION IN MULTIMEASUREMENT DATA

(71) Applicant: SCHLUMBERGER TECHNOLOGY CORPORATION, Sugar Land, TX (US)

(72) Inventors: Yousif Izzeldin Kamil Amin, Gatwick (GB); Pradeep Loganathan, Gatwick (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 491 days.

(21) Appl. No.: 14/882,903

(22) Filed: Oct. 14, 2015

(65) Prior Publication Data

US 2016/0109591 A1    Apr. 21, 2016

Related U.S. Application Data

(60) Provisional application No. 62/064,220, filed on Oct. 15, 2014.

(51) Int. Cl.
*G01R 23/16* (2006.01)
*G01V 1/30* (2006.01)
(Continued)

(52) U.S. Cl.
CPC ............... *G01V 1/30* (2013.01); *G01V 1/366* (2013.01); *G01V 1/187* (2013.01); *G01V 1/3808* (2013.01);
(Continued)

(58) Field of Classification Search
CPC .......... G01V 1/30; G01V 1/366; G01V 1/187; G01V 1/3808; G01V 2210/1423;
(Continued)

(56) References Cited

U.S. PATENT DOCUMENTS 7,525,873 B1    4/2009 Bush et al.
7,676,327 B2    3/2010 Ozdemir et al.
(Continued)

FOREIGN PATENT DOCUMENTS

EP    1159639 B1    1/2005
GB    2337591 B     7/2000

OTHER PUBLICATIONS

International Preliminary Report on Patentability for the equivalent International patent application PCT/US2015/055628 dated Apr. 27, 2017.
(Continued)

*Primary Examiner* — Huan Hoang
(74) *Attorney, Agent, or Firm* — Michael Guthrie

(57) ABSTRACT

Various implementations described herein are directed to methods for processing seismic data, including estimating a spectral noise power of multi-measurement seismic data received from a multi-dimensional seismic sensor array having multiple seismic sensors. The methods may include receiving a shot record of multi-measurement seismic data in time-domain, partitioning the shot record into overlapping time-space windows, and computing a frequency-domain spectrum for each time-space window. The methods may include computing a signal presence probability for each time-space window using the frequency-domain spectrum and prior probabilities of signal presence and absence for each time-space window. The methods may include iteratively updating a collective spectral noise power by recursively estimating the spectral noise power of a current time-space window based on the frequency spectrum for the current time-space window, the signal presence probability computed for the current time-space window, and a previously estimated spectral noise power of a previous time-space window.

20 Claims, 4 Drawing Sheets

(51) Int. Cl.
*G01V 1/36* (2006.01)
*G01V 1/38* (2006.01)
*G01V 1/18* (2006.01)

(52) U.S. Cl.
CPC .......... *G01V 2210/144* (2013.01); *G01V 2210/1423* (2013.01); *G01V 2210/3248* (2013.01); *G01V 2210/34* (2013.01)

(58) Field of Classification Search
CPC ..... G01V 2210/144; G01V 1120/3248; G01V 2210/34
USPC .......................................................... 702/77
See application file for complete search history.

(56) References Cited

U.S. PATENT DOCUMENTS

| | | | |
|---|---|---|---|
| 7,869,304 B2* | 1/2011 | Olson et al. | 367/38 |
| 2010/0228530 A1 | 9/2010 | Valero et al. | |
| 2011/0134721 A1 | 6/2011 | Deffenbaugh et al. | |
| 2014/0200854 A1 | 7/2014 | Eggenberger et al. | |
| 2015/0131409 A1* | 5/2015 | Abma | G01V 1/003 367/7 |

OTHER PUBLICATIONS

Anderson et al., "Automatic Editing of Noisy Seismic Data", Geophysical Prospecting, vol. 37, Issue 8, Nov. 1989, pp. 875-892.
Bekara et al., "High-amplitude noise detection by the expectation-maximization algorithm with application to swell-noise attenuation", Geophysics, vol. 75, Issue 3, May 2010, pp. V39-V49.
Cambois et al., "Can we surgically remove swell noise?" SEG Technical Program Expanded Abstracts 1995, pp. 1381-1384.
Caprioli et al., "Combination of multi-component streamer pressure and vertical particle velocity: theory and application to data", SEG Technical Program Expanded Abstracts 2012, pp. 1-5.
Naghizadeh et al., "Multicomponent f-x seismic random noise attenuation via vector autoregressive operators", Geophysics, vol. 77, Issue 2, Mar. 2012, pp. V91-V99.
Ozbek et al., "Crossline wavefield reconstruction from multicomponent streamer data: Part 2—Joint interpolation and 3D up/down separation by generalized matching pursuit", Geophysics, vol. 75, Issue 6, Nov. 2010, pp. WB69-WB85.
Ozdemir et al., "Digital Noise Attenuation of Particle Motion Data in a Multicomponent 4C Towed Streamer", 74th EAGE Conference & Exhibition, Copenhagen, Denmark, Jun. 4-7, 2012 (5 pages).
Ozdemir et al., "The optimal deghosting algorithm for broadband data combination", SEG Technical Program Expanded Abstracts 2009, pp. 147-151.
Rentsch et al., "Multidomain Noise Attenuation for Multimeasurement Towed Streamer Data", 75th EAGE Conference & Exhibition, London, UK, Jun. 10-13, 2013 (5 pages).
Robertsson et al., "On the use of multicomponent streamer recordings for reconstruction of pressure wavefields in the crossline direction", Geophysics, vol. 73, Issue 5, Sep. 2008, pp. A45-A49.
Vassallo et al., "Crossline wavefield reconstruction from multicomponent streamer data: Part 1—Multichannel interpolation by matching pursuit (MIMAP) using pressure and its crossline gradient", Geophysics, vol. 75, Issue 6, Nov. 2010, pp. WB53-WB67.
International Search Report and Written Opinion issued in related International Application No. PCT/US2015/055628 dated Dec. 3, 2015 (15 pages).

* cited by examiner

NOISE MODEL ESTIMATION IN MULTIMEASUREMENT DATA

BACKGROUND

Seismic exploration involves surveying subterranean geological formations for hydrocarbon deposits. A seismic survey may involve deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (e.g., hydrophones), others to particle motion (e.g., geophones), and industrial surveys may deploy one type of sensors or both. In response to the detected seismic events, the sensors generate electrical signals to produce seismic data. Analysis of the seismic data may be used to determine the presence or the absence of probable locations of hydrocarbon deposits.

With conventional techniques, some pre-stack and post-stack noise-reduction applications may use an estimate of the noise power spectrum, such as detection and replacement of noisy traces in the frequency spectrum due to, e.g., swell and barnacle noise, in the case of marine seismic data processing. Sometimes, Wiener filtering can be applied to noisy signals by utilizing random noise attenuation. Thus, random noise can be commonly estimated by averaging the data power spectrum of noisy traces by assuming that the noise is time-space stationary. In pre-stack seismic data, the noise can vary spatially and temporally. Also, robustness of noise power estimation, e.g., under low signal-to-noise ratio (SNR) conditions and non-stationary noise environments, can be affected by reliably tracking fast variations in the statistics of noisy traces. In multi-measurement towed streamer marine seismic data, when measuring full particle velocity vectors in addition to pressure, the noise spectrum is conventionally estimated in each component separately. However, this conventional technique is inefficient, and as such, other multi-measurement noise power spectrum approaches should be considered.

SUMMARY

Described herein are implementations of various technologies of a method for processing seismic data, including estimating spectral noise power of multi-measurement seismic data received from a multi-dimensional seismic sensor array having multiple seismic sensors. In one implementation, the method may include receiving a shot record of the multi-measurement seismic data in time-domain, partitioning the shot record into a plurality of overlapping time-space windows, and computing frequency-domain spectrum for each time-space window. The method may include computing a signal presence probability for each time-space window using the frequency-domain spectrum and prior probabilities of signal presence and absence for each time-space window. The method may include iteratively updating a collective spectral noise power by recursively estimating the spectral noise power of a current time-space window based on the frequency spectrum for the current time-space window, the signal presence probability computed for the current time-space window, and a previously estimated spectral noise power of a previous time-space window.

Described herein are implementations of various technologies of an apparatus or device configured to process seismic data, including estimating a spectral noise power of multi-measurement seismic data received from a multi-dimensional seismic sensor array having multiple seismic sensors. In one implementation, the apparatus may include a processor and memory having instructions stored thereon that, when executed by the processor, cause the processor to process the seismic data. In one implementation, the instructions may be configured to cause the processor to receive a shot record of the multi-measurement seismic data in time-domain, partition the shot record into a plurality of overlapping time-space windows, and compute a frequency-domain spectrum for each time-space window. The instructions may be configured to further cause the processor to compute a signal presence probability for each time-space window based on frequency spectrum computed for each time-space window and previous information computed for a previous time-space window. The instructions may be configured to further cause the processor to estimate the spectral noise power of the current time-space window based on the frequency spectrum for the current time-space window, the signal presence probability computed for the current time-space window, and a previously estimated spectral noise power computed for the previous time-space window.

Described herein are further implementations of various technologies of a non-transitory computer-readable medium having stored thereon a plurality of computer-executable instructions which, when executed by a computer, cause the computer to estimate a spectral noise power of multi-measurement seismic data received from a multi-dimensional seismic sensor array having multiple seismic sensors. In one implementation, the computer-executable instructions that cause the computer to estimate the spectral noise power include computer-executable instructions that cause the computer to receive a shot record of the multi-measurement seismic data in time-domain, partition the shot record into a plurality of overlapping time-space windows, and compute a frequency-domain spectrum for a current time-space window. The instructions may be configured to cause the processor to compute a signal presence probability for the current time-space window based on the frequency-domain spectrum and prior probabilities of signal presence and absence for the current time-space window. The instructions may be configured to further cause the processor to estimate the spectral noise power of the current time-space window based on the frequency spectrum for the current time-space window and the signal presence probability computed for the current time-space window. The instructions may be configured to further cause the processor to iteratively update a collective spectral noise power of the current time-space window by recursively estimating the spectral noise power of the current time-space window based on the frequency spectrum for the current time-space window, the signal presence probability computed for the current time-space window, and a previously estimated spectral noise power of a previous time-space window.

The above referenced summary section is provided to introduce a selection of concepts in a simplified form that is further described in the detailed description section herein below. The summary is not intended to identify features of claimed subject matter, nor is it intended to be used to limit the scope of the claimed subject matter. The claimed subject matter is not limited to implementations that solve any disadvantages noted in any part of this disclosure.

BRIEF DESCRIPTION OF THE DRAWINGS

Implementations of various techniques will hereafter be described with reference to the accompanying drawings. It should be understood, however, that the accompanying drawings illustrate the various implementations described herein and are not meant to limit the scope of various techniques described herein.

DETAILED DESCRIPTION

Figure 1:
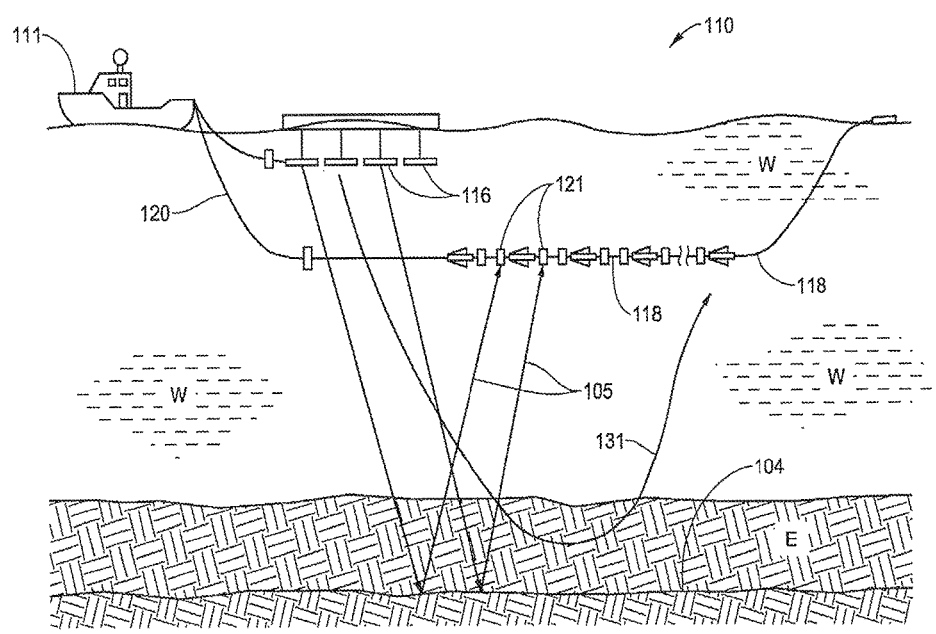
FIG. 1 illustrates a diagram of a marine system for acquiring seismic survey data using multi-dimensional seismic sensor arrays in connection with implementations of various techniques described herein.

The discussion below is directed to certain specific implementations. It is to be understood that the discussion below is for the purpose of enabling a person with ordinary skill in the art to make and use any subject matter defined now or later by the patent "claims" found in any issued patent herein.

It will also be understood that, although the terms first, second, etc. may be used herein to describe various elements, these elements should not be limited by these terms. These terms are used to distinguish one element from another. For example, a first object or block could be termed a second object or block, and, similarly, a second object or block could be termed a first object or block, without departing from the scope of the disclosure. The first object or block, and the second object or block, are both objects or blocks, respectively, but they are not to be considered the same object or block.

The terminology used in the description herein is for the purpose of describing particular implementations and is not intended to limit the claimed subject matter. As used herein, the singular forms "a", "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises," and/or "comprising," when used in this specification, specify the presence of stated features, integers, blocks, operations, elements, and/or components, but do not preclude the presence or addition of one or more other features, integers, blocks, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Reference will now be made in detail to various implementations, examples of which are illustrated in the accompanying drawings and figures. In the following detailed description, numerous specific details are set forth in order to provide a thorough understanding of the claimed subject matter. However, it will be apparent to one of ordinary skill in the art that the claimed subject matter may be practiced without these specific details. In other instances, well known methods, procedures, components, circuits, and networks have not been described in detail so as not to unnecessarily obscure aspects of the claimed subject matter.

The following paragraphs provide various techniques for estimating a spectral noise power of multi-measurement seismic data received from a multi-dimensional seismic sensor array having multiple seismic sensors coupled to a marine vessel, which will now be described in more detail with reference to FIGS. 1-4.

Seismic Surveying Systems and Methods

FIG. 1 illustrates a diagram of a marine system for acquiring seismic survey data using multi-dimensional seismic sensor arrays in accordance with implementations of various techniques described herein.

As shown in FIG. 1, a marine seismic acquisition system 110 may include a vessel 111 carrying control components and towing a plurality of seismic sources 116 and a plurality of streamers 118 equipped with seismic receivers 121. The seismic sources 116 may include a single type of source, or different types. The seismic sources 116 may use any type of seismic generator, such as air guns, water guns, steam injection sources, controllable seismic sources, explosive sources, such as, e.g., dynamite or gas injection, followed by detonation and the like. The streamers 118 may be towed by means of their respective lead-ins 120, which may be made from high strength steel or fiber-reinforced cables that convey electrical power, control, and data signals between the vessel 111 and the streamers 118. An individual streamer may include a plurality of seismic receivers 121 that may be distributed at spaced intervals along the streamer's length. The seismic receivers 121 may include various seismic sensors, such as, e.g., hydrophone sensors as part of a multi-component sensor device including other seismic sensors, such as, e.g., one or more accelerometers. The streamers 118 may include a plurality of inline streamer steering devices (SSDs), also known as "birds." The SSDs may be distributed at appropriate intervals along the streamers 118 for controlling the streamers' depth and lateral movement. A single survey vessel may tow a single receiver array along individual sail lines, or a plurality of survey vessels may tow a plurality of receiver arrays along a corresponding plurality of the sail lines.

During acquisition, the seismic sources 116 and the seismic streamers 118 may be deployed from the vessel 111 and towed slowly to traverse a region of interest. The seismic sources 116 may be periodically activated to emit seismic energy in the form of an acoustic or pressure wave through the water. The sources 116 may be activated individually or substantially simultaneously with other sources. The acoustic wave may result in one or more seismic wavefields that travel coherently into the earth E underlying the water W. As the wavefields strike interfaces 104 between earth formations, or strata, they may be reflected and/or refracted back through the earth E and water W along paths 105 to the various receivers 121 where the wavefields (e.g., pressure waves in the case of air gun sources) may be converted to electrical signals, digitized and transmitted to the integrated computer-based seismic navigation, source controller, and recording system in the vessel 111 via the streamers 118 and lead-ins 120. For instance, a refracting or diving wave path 131 is shown passing through the earth E and water W from the sources 116 to the seismic receivers 121. Through analysis of these detected signals, it may be possible to determine the shape, position, and/or lithology of the subsea formations, including those formations that may include hydrocarbon deposits. While a marine based seismic survey is described in regard to FIG. 1, implementations of various techniques described herein may also be used in connection to a land based seismic survey.

Multi-Dimensional Seismic Sensor Array

In some implementations, the seismic receivers 121 may be configured as a multi-dimensional seismic sensor array. The term multi-dimensional may refer to two-dimensional (2D), three-dimensional (3D), or more than three dimensional, depending on specific implementations. The multi-dimensional seismic sensor array may be referred to as a seismic sensor package having multiple seismic sensors configured to acquire multi-measurement seismic survey data and calculate pressure gradients in multiple directions, such as, e.g., horizontal and vertical directions. Further, multiple directions may refer to x-coordinate, y-coordinate, and/or z-coordinate directions.

The multi-dimensional seismic sensor array may include various sensors including pressure sensors, particle motion sensors, and/or multi-component seismic sensors. For instance, when referring to multi-component seismic sensors, the multi-dimensional seismic sensor array may be configured to detect a pressure wavefield and at least one component of a particle motion that is associated with acoustic signals that may be proximate to the multi-component seismic sensor. Further, examples of particle motion sensors include one or more components of a particle displacement, one or more components (inline (x), crossline (y) and vertical (z) components) of a particle velocity and one or more components of a particle acceleration.

In various implementations, the multi-component seismic sensors may include one or more geophones, hydrophones, inclinometers, particle displacement sensors, optical sensors, particle velocity sensors, accelerometers, pressure gradient sensors, or combinations thereof. In some implementations, a multi-component seismic sensor may include three orthogonally-aligned accelerometers (e.g., three-component micro-electro-mechanical system (MEMS) accelerometer orthogonally-aligned in x, y, and z directions) to measure three corresponding orthogonal x-y-z components of particle velocity and/or acceleration near the seismic sensor. The MEMS-based accelerometer may include a capacitive MEMS-based sensor of the type described in commonly assigned issued U.S. Pat. No. 8,104,346, which is incorporated herein by reference. In some implementations, one or more hydrophones configured for measuring pressure may be used in combination with the three-component MEMS described herein.

The multi-component seismic sensor may be implemented as a single device or as a plurality of devices. A particular multi-component seismic sensor may also include pressure gradient sensors, which constitute another type of particle motion sensors. Each pressure gradient sensor measures the change in the pressure wavefield at a particular point with respect to a particular direction. For example, one of the pressure gradient sensors may acquire seismic data indicative of, at a particular point, the partial derivative of the pressure wavefield with respect to the crossline direction, and another one of the pressure gradient sensors may acquire, at a particular point, seismic data indicative of the pressure data with respect to the inline direction.

Seismic Survey Data Acquisition

After deploying the vessel 111 to the survey area, one or more seismic sources 116 may be detonated to generate acoustic waves or wavefield along the paths 105 that propagate through an ocean bottom surface and into strata or interfaces 104 beneath the ocean bottom surface. As described above, the seismic sources 116 may be an air gun, marine vibrator, or non-traditional environmentally friendly source. The seismic sources may also include drilling induced acoustic pressure waves, passive seismic noise, or production induced acoustic pressure waves, such as those which may result from water or gas injections, or combinations thereof. Acoustic signals may be reflected from various subterranean geological formations, and incident acoustic signals produce corresponding reflected acoustic signals, or pressure waves, which are sensed by the multi-dimensional seismic sensor array of the seismic receivers 116. The vessel 111 may record seismic data from over one hundred seismic sensors.

The multi-dimensional seismic sensor array may generate signals referred to as "traces," which indicate the acquired measurements of the pressure wavefield and particle motion if the sensors include particle motion sensors. The traces are recorded and may be passed to a data acquisition system disposed on the vessel 111. The data acquisition system may include a digitizer, a computer system, and a storage system for storing seismic data acquired during the survey, and the storage system may include memory, such as a hard disk drive. The seismic data may be recorded continuously over days or months at a time. In another implementation, the seismic data may be recorded intermittently, such as after each detonation of the seismic source 116.

The vessel 111 may include an onboard communication unit, system, or device configured to communicate with a base station located onshore or at sea, such as on a rig or vessel. The communication unit may be used to transmit data and information associated with the vessel 111, including, e.g., position, quality control parameters, time information, and seismic survey data. The communication unit may send or receive commands particular to the seismic survey. The vessel 111 may include a power source (e.g., engine, batteries, motor, propeller, etc.) configured to drive and provide propulsion to the vessel 111. In some examples, the vessel 111 may be powered by batteries, which may be recharged by solar panels disposed on the top of the vessel 111.

In some implementations, the streamer 118 may descend in a generally vertical direction from the vessel 111 into the water column. The length of the streamer 118 may vary from less than one meter to over one kilometer. In some instances, a sub component may be disposed between the streamer 118 and the multi-dimensional seismic sensor array. The sub component may be configured to provide electrical communication between the vessel 111 and the multi-dimensional seismic sensor array. In some cases, the sub component may be employed as a fairing to reduce cross-flow noise due to currents and drag forces. Further, accelerometers capable of measuring a gravity vector may be used to measure a tilt of the streamer 118 relative to the vertical.

Seismic Data Processing

Various implementations described herein refer to and are directed to tracking a noise power spectrum and/or a signal-to-noise ratio (SNR) in space and time to improve seismic imaging for facilitating hydrocarbon exploration. As such, some of these implementations provide a signal and noise power spectrum estimation in a number of overlapping windows in frequency space (f-x), and frequency wavenumber domain. Further, some of these implementations provide a robust tracking of signal and noise for each component separately, and may be used to estimate the SNR in one component based on the information provided by another component about the signal presence probability in each frequency bin. Some of these implementations may be based on a Bayesian recursive framework that tracks information about second order statistics of the measured multi-measurement data. Some of these implementations may include tracking noise during signal activity and using signal presence probability (SPP) estimation. As such, some of these implementations may use prior information along with statistical models provided by the user. Further, some of these implementations may use results of independent rough noise tracking schemes, and this may provide an estimation of SNR, especially in some cases, at low SNR.

Any recorded energy that may interfere with the desired signal measured by the multi-measurement towed marine streamer may be considered as noise. In multi-measurement marine seismic acquisition, several different sources of noise that affect quality of measurements may be encountered and may result in sub-optimal performance for the wavefield 3D deghosting and crossline reconstruction stages. The hydrophones measure different types of noise (e.g., hydrostatic pressure variation noise, Swell noise, Tugging/strumming noise from the vessel) and the noise model is often non-stationary, i.e., its strength changes considerably within a single shot record. Further, the motion of towed-streamers may be an energetic source of noise on particle velocity measurements (and thus, pressure gradient signal). The particle motion sensors may measure streamer-borne noise such as, e.g., longitudinal, transversal, and torsional noise. The dominant noise modes may refer to torsional vibrations. This noise may be perceived by particle motion sensors several orders of magnitude stronger than the noise measured by hydrophones at low and high frequencies. Moreover, the noise may be non-stationary in space and may change considerably within a single shot record.

Efficient pre-stack noise attenuation may improve the quality of results of several seismic processing methods (e.g., reconstruction, multiple removals, AVO analysis, pre-stack inversion, just to mention some). It may also be one of the main methods used before pre-stack migration as the migration operator smears the noise, making it difficult to fix afterwards. Different approaches may be taken to reduce the impact of noise in multi-measurement towed marine data, such as: 1) different pressure and particle velocity noise models may be attenuated by optimizing the mechanical design of the streamer, and 2) the noise modes that cannot be reduced sufficiently by mechanical design may be separated from the desired signal in some data-domains, and therefore may be attenuated by digital noise processing techniques. To further attenuate the residual noise that may not be separated from the desired signal, statistical based methods may be used. These methods aim to attenuate the noise while preserving signal vector fidelity. In some cases, these methods may combine the multi-measurement data for efficient interpolation and/or deghosting by optimizing the resulting signal-to-noise-ratio (SNR). In other cases, such as bad trace detection and random noise attenuation, these methods simply aim to attenuate the noise while minimizing the signal leakage. As such, these statistical methods may derive a noise power spectrum from the pressure and particle velocity measurements.

In accordance with various implementations described herein, one technique to estimate spectral noise power may refer to exploiting time instances where a desired signal is absent. This may be done by averaging the data power spectrum from noise dominated windows. This may assume that noise is time-space stationary. As mentioned above, the noise model encountered in pressure and particle velocity measurements may change in space and time. Therefore, its estimate may be updated often. Further, using an overestimate or an underestimate of the true, but unknown, spectral noise power may lead to an over-suppression or under-suppression of the noisy signal, which may lead to signal distortion or an unnecessary amount of residual noise when employed in a seismic signal enhancement framework. These and various other aspects related to estimating spectral noise power will be described in greater detail herein below.

Noise Model Estimation Process

Various implementations described herein propose a framework to estimate the spectral noise power and the signal-to-noise ratio (SNR) on marine seismic data to improve seismic imaging for facilitating hydrocarbon exploration. This framework may be applied separately to each measurement to estimate its corresponding noise power spectrum. Within the framework, the information from the correlation of the multi-measurement data may be used to estimate the power spectral density in each measurement. In addition to allowing to update the noise power estimation with the presumption of absence of signal, the framework also tracks dynamically any realistic level of non-stationary noise models. Some information that may be useful within this type of framework may include an initial noise power spectrum that may be estimated from low SNR windows (e.g., early time-large offset, late times). One assumption may refer to a case where a signal is coherent in space, but any random noise may not. As such, noise attenuation techniques based on this assumption may be used to derive an initial noise power spectrum estimate. Further, a signal model in multi-measurement data may be known, while noise models, either coherent or incoherent, may not. If the SNR is known to be high in one measurement, then the SNR may be used as a reference to estimate the noise in other measurements.

Figure 2:
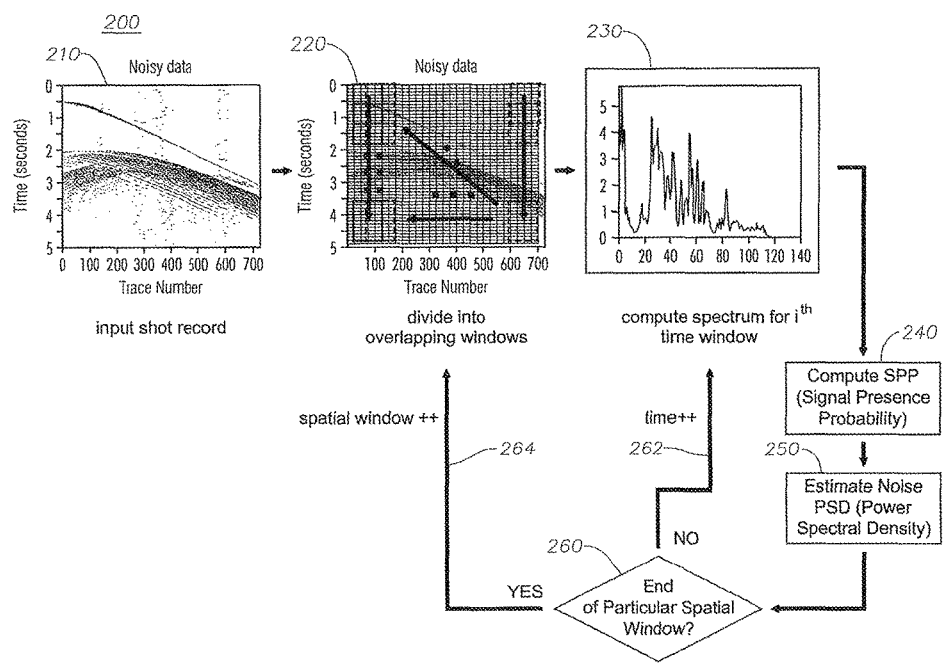
FIG. 2 illustrates a diagram of a process for estimating a noise model in multi-measurement data that was acquired using multi-dimensional seismic sensor arrays in accordance with implementations of various techniques described herein.

FIG. 2 illustrates a diagram of a method 200 for estimating a noise model in multi-measurement data that was acquired using multi-dimensional seismic sensor arrays in accordance with implementations of various techniques as described herein. In some implementations, estimating a noise model may refer to estimating a spectral noise power of the multi-measurement seismic data received from a multi-dimensional seismic sensor array having multiple seismic sensors. The spectral noise power may refer to the power spectral density (PSD) of the noise in a signal or in a received signal. Further, estimating noise may refer to a technique that includes a frequency dependent, noise estimation for each time-space (or time-domain) window, as further described herein below.

At block 210, method 200 may receive a shot record of multi-measurement seismic data in time-domain. In some cases, the multi-measurement seismic data may include stationary noise and non-stationary noise. The multi-dimensional seismic sensor array may be coupled to a streamer that is towed by a marine vessel, and the multiple seismic sensors may be coupled to the streamer at intervals along the streamer, as shown in FIG. 1. Further, the multiple seismic sensors may include at least one hydrophone and a plurality of accelerometers including a first accelerometer configured in an x-coordinate direction, a second accelerometer configured in a y-coordinate direction, and a third accelerometer configured in a z-coordinate direction. In some cases, the shot record may include a combination of up-going and down-going wavefield data along with pressure noise data reflected from geological formations.

At block 220, method 200 may partition the shot record into a plurality of overlapping time-space windows. In various implementations, partitioning may refer to partitioning the shot record into a plurality of columns such that each column may include a columnar series of overlapping time-space windows, and each column may be offset from each other column by at least one time-space window. For instance, as shown in FIG. 2, the windows may be arranged in a series of columns starting at an upper right-hand corner and sequence down toward the lower right-hand corner. Once this furthest right-hand column has been processed, the offset moves to the left by one window, and a next column is sequenced until each of the windows in each of the columns are recursively processed, as described in reference to block 260 below. In some implementations, the term "time-space" may be referred to as "time-space domain", wherein, e.g., the overlapping time-space windows may be referred to as overlapping time-space domain windows.

At block 230, method 200 may compute an averaged frequency-domain spectrum for each (or ith) time-space window. In some implementations, computing the frequency-domain spectrum for each time-space window may include transforming each time-space window into a frequency-domain window using a Fast Fourier Transform (FFT), which may be referred to as a short-time Fourier transform. However, in other implementations, a wavelet transform may be used or some other type of transform may be used.

At block 240, method 200 may compute a signal presence probability (SPP) for each time-space window based on the computed frequency-domain spectrum and prior probabilities of signal presence and absence for each time-space window. In some implementations, the prior probabilities of signal presence and absence for each time-space window refer to respective likelihood functions of the multi-measurement seismic data in case of signal presence and absence. The SPP, prior probabilities, and relevant prior information is described in greater detail herein below.

At block 250, method 200 may estimate the spectral noise power of the current time-space window based on the frequency spectrum for the current time-space window, the signal presence probability computed for the current time-space window, and a previously estimated spectral noise power computed for the previous time-space window. As such, in some implementations, method 200 may estimate the spectral noise power of the previous time-space window based on the frequency spectrum for the previous time-space window and the signal presence probability computed for the previous time-space window. The previous or prior information may be used to compute the SPP and further estimate the spectral noise power of each window including previous, current, and next windows in sequential iteration, as further described herein. Further, estimating the spectral noise power may include estimating SNR.

In some implementations, at block 250, method 200 may be configured to use an equation to estimate the spectral noise power (or noise PSD). For instance, method 200 may use: Estimated Noise PSD=SPP*[Previous Estimated Noise PSD]+[1−SPP]*Current Window's Frequency Spectrum. Various other equations related to calculating or computing Estimated Noise PSD, SPP, prior probabilities, and various other relevant prior information is described in greater detail herein below.

At block 260, method 200 may determine whether to advance in time 262 by a time offset within a column of time-space windows or advance a trace offset 264 to an adjacent, neighboring column of time-space windows. From block 260, if no, method 200 advances in time 262 to a next time-space window within the same column as the previous time-space window and then return to block 230 to compute the frequency spectrum for the next time-space window. From block 260, if yes, method 200 returns to block 220 to advance the trace offset 264 to an adjacent, neighboring column of time-space windows before returning to block 230 to compute the frequency spectrum for the next time-space window within the adjacent, neighboring column.

In some implementations, method 200 may iteratively update a collective spectral noise power by recursively estimating the spectral noise power of a current time-space window based on the frequency spectrum for the current time-space window, the signal presence probability computed for the current time-space window, and a previously estimated spectral noise power of a previous time-space window. Further, method 200 may be configured to iteratively update a collective spectral noise power, which may refer to a Bayesian recursive framework that is adapted to recursively estimate the spectral noise power of a current time-space window based on the frequency spectrum for the current time-space window, the signal presence probability computed for the current time-space window, and a previously estimated spectral noise power of a previous time-space window.

In some implementations, the multi-measurement seismic data may include stationary noise and non-stationary noise. Thus, estimating the spectral noise power may include estimating spectral noise power of the stationary noise and non-stationary noise in the multi-measurement seismic data.

In some implementations, method 200 may further include deriving an initial spectral noise power that is estimated from a time-space window having a least signal-to-noise ratio (SNR) when compared to other time-space windows. In some cases, the initial spectral noise power may be used for recursively estimating the spectral noise power of the current time-space window.

Multi-Measurement Signal Model

As described above in reference to block 210 of FIG. 2, a shot record of multi-measurement seismic data in time-space may be received by a seismic data acquisition device, such as the seismic receives 121 of FIG. 1. In marine seismic acquisitions, the sensors may record a desired up-going wavefield reflected from geological formations, as well as reflections from the sea surface that may be referred to as the down-going wavefield, or seismic ghost. In some cases, an equivalent scenario may be if the source was deeper than the measuring cable.

Assuming that the direct arrival has been removed from the measured data, the measured pressure data may be written as the combination of up-going and down-going wavefields as well as measured noise, as described by the following equation:

$$P_n = U + D + N_p \qquad (1)$$

In this expression, U represents the up-going wavefield; D represents the down-going wavefield; and $N_p$ is the pressure noise. In the frequency domain, D may be written as a function of U by using the wavefield extrapolation operator Ψ and the reflection coefficient ε at the water-air interface as follows:

$$D(f)=\varepsilon \Psi U(f)=\varepsilon e^{-j2\pi f\tau}U(f) \quad (2)$$

In this equation, j is the imaginary unit, f represents frequency and τ is the time delay that the up-going wave may take to travel to the sea surface and reflect back to the receiver, and the time delay may depend on the angle of incidence of the wavefield. In the special case of vertical incidence angle, the delay may be τ=2z/c where z is the cable depth and c is the acoustic speed of seismic wave in water. The same expression may be written in the frequency wave number (FK) domain as:

$$D(f,k)=\varepsilon e^{-j2zk_z}U(f,k) \quad (3)$$

where $k_z$ represents the vertical wave number and may be given by:

$$k_z = \frac{2\pi f}{c}\cos\theta = \sqrt{\left(\frac{2\pi f}{c}\right)^2 - k_x^2 - k_y^2} \quad (4)$$

where θ is the incidence angle of the wavefield at the receiver position. The $k_x$ and $k_y$ denote the inline and cross line wave numbers, respectively. By substituting the expression for D given by equation (2) or (3) into equation (1), the following expression may be obtained for the total pressure:

$$P_n=P+N_p=(1+\varepsilon e^{-j2zk_z})U+N_p=G_pU+N_p \quad (5)$$

Where $G_p$ is commonly referred to as the pressure ghost operator. The inline pressure gradient may be written as:

$$\begin{aligned}P_{x_n} &= P_x + N_x \\ &= jk_x(U+D)+N_x \\ &= jk_x(1+\varepsilon e^{-j2zk_z})U+N_x \\ &= G_xU+N_x\end{aligned} \quad (6)$$

The crossline pressure gradient may be written as:

$$\begin{aligned}P_{y_n} &= P_y + N_y \\ &= jk_y(U+D)+N_y \\ &= jk_y(1+\varepsilon e^{-j2zk_z})U+N_y \\ &= G_yU+N_y\end{aligned} \quad (7)$$

Similarly, in some cases, considering that the down-going wave direction may have opposite vertical polarity with respect to the up-going wave direction, the vertical pressure gradient $P_z$ may be represented as:

$$\begin{aligned}P_{z_n} &= P_z + N_z \\ &= jk_z(U-D)+N_z \\ &= jk_z(1-\varepsilon e^{-j2zk_z})U+N_z \\ &= G_zU+N_z\end{aligned} \quad (8)$$

The $G_x$, $G_y$, $G_z$ respectively denote the inline, crossline and vertical operators for the gradient of the pressure wavefield and $N_x$, $N_y$, $N_z$ represent the measured noise. The ghost operators affecting the pressure and the vertical velocity may have different signs, as the down-going vertical velocity wavefield may be reversed.

As the pressure gradient may be proportional to the particle acceleration vector, that expression may be described as:

$$\nabla P = -\rho a,$$

where ρ is the density of the medium, the accelerometer measurements may be represented by the models in (6), (7) and (8) up to a scaling factor. As such, in some implementations, particle motion measurements may be used to represent the spatial gradient of the pressure wavefield.

Noise Analysis Techniques

Generally, noise analysis techniques related to seismic data may be classified into stationary and non-stationary. Some stationary noise analysis techniques assume that the noise model is stationary in space and/or time and thus rely on areas where the SNR is low to estimate the noise power spectrum.

Some non-stationary noise analysis techniques may be designed to attenuate high amplitude non-stationary noise, which may be achieved by detecting traces with anomalously high noise content. The amplitude of the data may be compared in a certain domain to a local hard threshold that may be determined manually or automatically. Data whose amplitude exceeds the threshold may be replaced by damping or interpolation. In these methods, a hard threshold may be used to discriminate between good and bad traces. Some techniques may be designed to use the amplitude as the main feature to distinguish between good and bad traces and ignore other useful information such as coherency and the multi-measurement signal model in such cases.

Various implementations described herein are directed to estimating spectral noise power or noise power spectral density (PSD) for stationary and non-stationary noise in the multi-measurement seismic data. In these implementations, a Bayesian framework may be used for the PSD estimation of such noise. The same framework may be applied in different domains (e.g., frequency-space, frequency-wave number). Measurements may be transformed into the short time Fourier transform domain (other domains such as the wavelet transform may also be used). The multi-measurements are divided into small time-space overlapping windows and transformed into frequency domain. For instance, as described in reference to blocks 220, 230 of FIG. 2, a shot record may be partitioned into a plurality of overlapping time-space windows, and a frequency-domain spectrum for each time-space window may be computed. Assuming a single event with up-going wavefield U, the following set of equations may be used:

$$\underbrace{\begin{bmatrix}P_n\\P_{x_n}\\P_{y_n}\\P_{z_n}\end{bmatrix}}_{\underline{Y}(k)} = \underbrace{\begin{bmatrix}P\\P_x\\P_y\\P_z\end{bmatrix}}_{\underline{S}(k)} + \underbrace{\begin{bmatrix}N_P\\N_x\\N_y\\N_z\end{bmatrix}}_{\underline{N}(k)} \quad (9)$$

-continued $$\underbrace{\begin{bmatrix} P_n \\ P_{x_n} \\ P_{y_n} \\ P_{z_n} \end{bmatrix}}_{\underline{Y}(k)} = \underbrace{\begin{bmatrix} G_p \\ G_x \\ G_y \\ G_z \end{bmatrix}}_{\underline{S}(k)} + \underbrace{\begin{bmatrix} N_P \\ N_x \\ N_y \\ N_z \end{bmatrix}}_{\underline{N}(k)} \quad (10)$$

where k denotes the time frame index. By using vectors, these equations (9) and (10) take into account the multi-component implementation of the multi-dimensional seismic sensor array having multiple seismic sensors.

The desired signal $\underline{S}(k)$ and the noise $N(k)$ may be independent such that:

$$E\{|\underline{Y}(k)|^2\} = E\{|\underline{S}(k)|^2\} + E\{|\underline{N}(k)|^2\}$$

where $E\{.\}$ is the expectation operator taken with respect to the relevant distribution. Moreover, the noise may have a complex Gaussian distribution, while the desired signal distribution may be complex Gaussian or Super-Gaussian. Under signal presence uncertainty, for a given window of noisy multi-measurement data, the noise's PSD may be given by:

$$E\{\underline{N}(k)\underline{N}^H(k)|\underline{Y}(k)\} = (1-Pr(H_1|\underline{Y}(k)))E\{\underline{Y}(k)\underline{Y}^H(k)\} + Pr(H_1|\underline{Y}(k))E\{\underline{N}(k)\underline{N}^H(k)|\underline{Y}(k),H_1\}, \quad (11)$$

where $H_1$ and $H_0$ state signal presence and absence, respectively. Therefore, the soft weighting $Pr(H_1|\underline{Y}(k))$ is the signal presence probability (SPP) for a given $\underline{Y}(k)$ and $[\ ]^H$ is the Hermitian transpose. In some cases, as described in reference to block 240 of FIG. 2, a signal presence probability (SPP) for each time-space window may be computed based on the computed frequency-domain spectrum and prior probabilities of signal presence and absence for each time-space window.

In the signal absence, noise PSD may be the PSD of the input data as shown in the first expression of equation (11). Note that the formulation may be simplified to a subset of the measurements by using the vector $\underline{Y}(k)$ to denote the corresponding subset of measurements. In a particular case, the same equation may apply to single channel measurements (for instance, a pressure measurement).

Under the signal presence uncertainty, the noise PSD may be estimated as:

$$E\{\underline{N}(k)\underline{N}^H(k)|\underline{Y}(k),H_1\} = \hat{R}_{NN}(k-1), \quad (12)$$

where $\hat{R}_{NN}(k-1)$ is the previous estimation of the noise PSD. This estimate may be recursively smoothed as follows:

$$\hat{R}_{NN}(k) = \mu \hat{R}_{NN}(k) + (1-\mu)E\{\underline{N}(k)\underline{N}^H(k)|\underline{Y}(k)\} \quad (13)$$

With $0 \ll \mu < 1$, controls the contribution between the previous and the current noise estimate. In order to evaluate (11), the SPP may be evaluated using the Bayesian probability theorem as described in the following equation:

$$Pr(H_1|\underline{Y}(k)) = \frac{Pr(H_1) \cdot f_{(\underline{Y}(k)|H_1)}(\underline{Y}(k))}{Pr(H_1) \cdot f_{(\underline{Y}(k)|H_1)}(\underline{Y}(k)) + Pr(H_0) \cdot f_{(\underline{Y}(k)|H_0)}(\underline{Y}(k))} \quad (14)$$

where $Pr(H_1)$ and $Pr(H_0)$ are the signal presence and absence prior probabilities, respectively. The $f_{(\underline{Y}(k)|H_1)}$ and $f_{(\underline{Y}(k)|H_0)}$ refer to likelihood functions of the data in case of signal presence and absence, respectively.

As described in reference to block 250 of FIG. 2, the spectral noise power of the current time-space window may be estimated based on the frequency spectrum for the current time-space window, the signal presence probability (SPP) computed for the current time-space window, and a previously estimated spectral noise power computed for the previous time-space window. In some cases, spectral noise power of a previous time-space window may be estimated based on the frequency spectrum for the previous time-space window and the signal presence probability (SPP) computed for the previous time-space window. The previous or prior information may be used to compute the SPP and further estimate the spectral noise power of each window including previous, current, and next windows in sequential iteration, as further described herein.

In some cases, it should be noted that the prior probabilities may be obtained from other information including the time and the space of the data, the depth of the sea floor, seismic interference existence, etc. In order to evaluate the likelihood functions, the probability distribution function of the desired signal and noise may be used. For example, if the noise and desired signal are Gaussian distributed, then the likelihood functions may be obtained as follows:

$$f_{(\underline{Y}(k)|H_0)}(\underline{Y}(k)) = \frac{1}{\pi^M \det(R_{NN})} \exp\left(-\underline{Y}(k)^H \hat{R}_{NN,prior}^{-1} \underline{Y}(k)\right), \quad (15)$$

$$f_{(\underline{Y}(k)|H_1)}(\underline{Y}(k)) = \frac{1}{\pi^M \det(R_{YY})} \exp\left(-\underline{Y}(k)^H \hat{R}_{YY,prior}^{-1} \underline{Y}(k)\right), \quad (16)$$

where M is the multi-measurement dimension of the vector $\underline{Y}(k)$ (i.e., M=4, if $$\underline{Y}(k) = \begin{bmatrix} P_n \\ P_{x_n} \\ P_{y_n} \\ P_{z_n} \end{bmatrix},$$

and the matrices $\hat{R}_{NN,prior}$ and $\hat{R}_{YY,prior}$ are the prior noise and the measurement covariance matrices, which may be respectively defined as:

$$\hat{R}_{NN,prior} = \begin{bmatrix} \hat{\sigma}^2_{N_P,priori} & \hat{\sigma}_{N_P N_x,priori} & \hat{\sigma}_{N_P N_y,priori} & \hat{\sigma}_{N_P N_z,priori} \\ \hat{\sigma}_{N_x N_P,priori} & \hat{\sigma}^2_{N_x,priori} & \hat{\sigma}_{N_x N_y,priori} & \hat{\sigma}_{N_x N_z,priori} \\ \hat{\sigma}_{N_y N_P,priori} & \hat{\sigma}_{N_y N_P,priori} & \hat{\sigma}^2_{N_y,priori} & \hat{\sigma}_{N_y N_z,priori} \\ \hat{\sigma}_{N_z N_P,priori} & \hat{\sigma}_{N_z N_P,priori} & \hat{\sigma}_{N_z N_y,priori} & \hat{\sigma}^2_{N_z,priori} \end{bmatrix}, \quad (17)$$

and:

$$\hat{R}_{YY,prior} = \hat{R}_{SS,prior} + \hat{R}_{NN,prior}. \quad (18)$$

The $\hat{R}_{SS,prior}$ is the signal covariance matrix defined as:

$$\hat{R}_{SS,prior} = \begin{bmatrix} \hat{\sigma}^2_{P,priori} & \hat{\sigma}_{PP_x,priori} & \hat{\sigma}_{PP_y,priori} & \hat{\sigma}_{PP_z,priori} \\ \hat{\sigma}_{P_x P,priori} & \hat{\sigma}^2_{P_x,priori} & \hat{\sigma}_{P_x P_y,priori} & \hat{\sigma}_{P_x P_z,priori} \\ \hat{\sigma}_{P_y P,priori} & \hat{\sigma}_{P_y P_x,priori} & \hat{\sigma}^2_{P_y,priori} & \hat{\sigma}_{P_y P_z,priori} \\ \hat{\sigma}_{P_z P,priori} & \hat{\sigma}_{P_z P_x,priori} & \hat{\sigma}_{P_z P_y,priori} & \hat{\sigma}^2_{P_z,priori} \end{bmatrix} \quad (19)$$

where $\hat{\sigma}_{XY}$ is the correlation between X and Y. For a single event, the signal covariance matrix may be defined as:

$$\hat{R}_{SS,prior} = \begin{bmatrix} \hat{G}_p \\ \hat{G}_x \\ \hat{G}_y \\ \hat{G}_z \end{bmatrix} \begin{bmatrix} \hat{G}_p \\ \hat{G}_x \\ \hat{G}_y \\ \hat{G}_z \end{bmatrix}^H \hat{\sigma}^2_{U,priori}. \qquad (20)$$

The following paragraphs describe the prior information that may be used to obtain the noise and measurement covariance matrices. Using this information, the SPP may be calculated using equation (14), and the noise PSD may be updated iteratively by substituting the SPP and the (12) and (13) in (11). In some implementations, as described in reference to block 260 of FIG. 2, a collective spectral noise power may be iteratively updated by recursively estimating spectral noise power of a current time-space window based on a frequency spectrum for the current time-space window, a signal presence probability (SPP) computed for the current time-space window, and previously estimated spectral noise power of a previous time-space window.

Noise Prior Covariance Matrix

As previously described herein, to estimate the SPP, some prior information relevant to the estimated noise PSD and measurement covariance matrices may need to be determined. In some cases, the prior information for the noise covariance matrix may be estimated using different ways, as provided in the subsequent examples:

In one example, by assuming a certain degree of correlation between the noise power present in neighbouring signal time frame segments, it may be reasonable to use an averaged spectral noise power estimate of the previous spatial frames. Therefore, in this example, the noise in different measurements may be assumed to be independent (i.e. $\hat{R}_{NN,prior}$ is a diagonal matrix).

In another example, the noise covariance matrix may be estimated using the noise removed through a noise attenuation technique. Such noise attenuation technique may not need to be signal safe as a rough estimate of the noise power is needed. Moreover, the noise attenuation may be applied to a single one of the measurements. The signal power estimated from a noise-attenuated measurement may also be used to estimate the signal power in other measurements.

Measurement Covariance Matrix

In some cases, to estimate the measurement covariance matrix $\hat{R}_{YY,prior}$, the signal prior covariance matrix $\hat{R}_{SS,prior}$ may be estimated in addition to the $\hat{R}_{NN,prior}$. The signal prior covariance matrix, however, may exhibit larger degree of fluctuations between successive time segments. Therefore, previous estimate of the signal covariance may not be used. Instead, the subsequent example may be used:

In one example, using the estimated noise covariance matrix, the prior signal covariance matrix $\hat{R}_{SS,prior}$ may be obtained using a combination of two processes, the "update" process:

$$\hat{R}_{SS,prior}(k|k) = \hat{R}_{SS,prior}(k|k-1)\hat{R}_{yy,prior}^{-1}(k|k-1)\underline{Y}(k)$$
$$\underline{Y}^H(k))\hat{R}_{yy,prior}^{-1}(k|k-1)\hat{R}_{SS,prior}(k|k-1), \qquad (21)$$

and the "propagation" process:

$$\hat{R}_{SS,prior}(k|k-1) = (1-\alpha)\hat{R}_{SS,prior}(k-1|k-1) + \alpha\hat{R}_{SS,prior}(k-1|k-1)\hat{R}_{yy,prior}^{-1}(k-1|k-1)\underline{Y}(k-1)$$
$$\underline{Y}^H(k-1))\hat{R}_{yy,prior}^{-1}(k-1|k-1)\hat{R}_{SS,prior}(k-1|k-1), \qquad (22)$$

by following the rational of Kalman filtering. These recursive equations may be initialized using a generic initial prior estimate of the signal covariance matrix. In some implementations, the update process may be replaced by the signal covariance obtained by any vector measurement noise attenuation techniques.

In another example, if the SNR in one measurement is known to be very high, that measurement may provide a reliable estimate of the signal power, and the prior signal covariance matrix may be derived using the relation in (20). To see this, the pressure may be assumed to have high SNR at some frequencies and the signal power $\hat{\sigma}^2_{P,priori}$ may be obtained using any noise attenuation techniques. From (20), the prior up-going wave power may be obtained using:

$$\hat{\sigma}^2_{U,priori} = \frac{\hat{\sigma}^2_{P,priori}}{\hat{G}_p\hat{G}_p^H + \eta}, \qquad (23)$$

where $\eta$ is a stabilization factor. From $\hat{\sigma}^2_{U,priori}$, the signal covariance matrix may be directly obtained using equation (20). This may be used in the update process (21). Note that (20) and (23) may use a rough estimation of the ghost operators.

As described above, noise model estimation in multi-measurement data may refer to a process incorporating one or more operations. For instance, noise model estimation may include receiving multi-sensor marine seismic data as input. The multi-sensor marine seismic data may represent samples of a pressure wavefield and its spatial gradient. Noise model estimation may include dividing the multi-measurement data into overlapping time-space windows. In some cases, the overlapping time-space windows may be equal in size. Noise model estimation may include, for each time-space window, computing signal presence probability (SPP) at each frequency bin using Bayes' theorem based on prior information of the noise and signal and a noise statistical model, e.g., provided by a user. Noise model estimation may include estimating the noise model for a current time-space window based on a weighted average between the current and previous time-space window using the SPP at each frequency bin.

Figure 3:
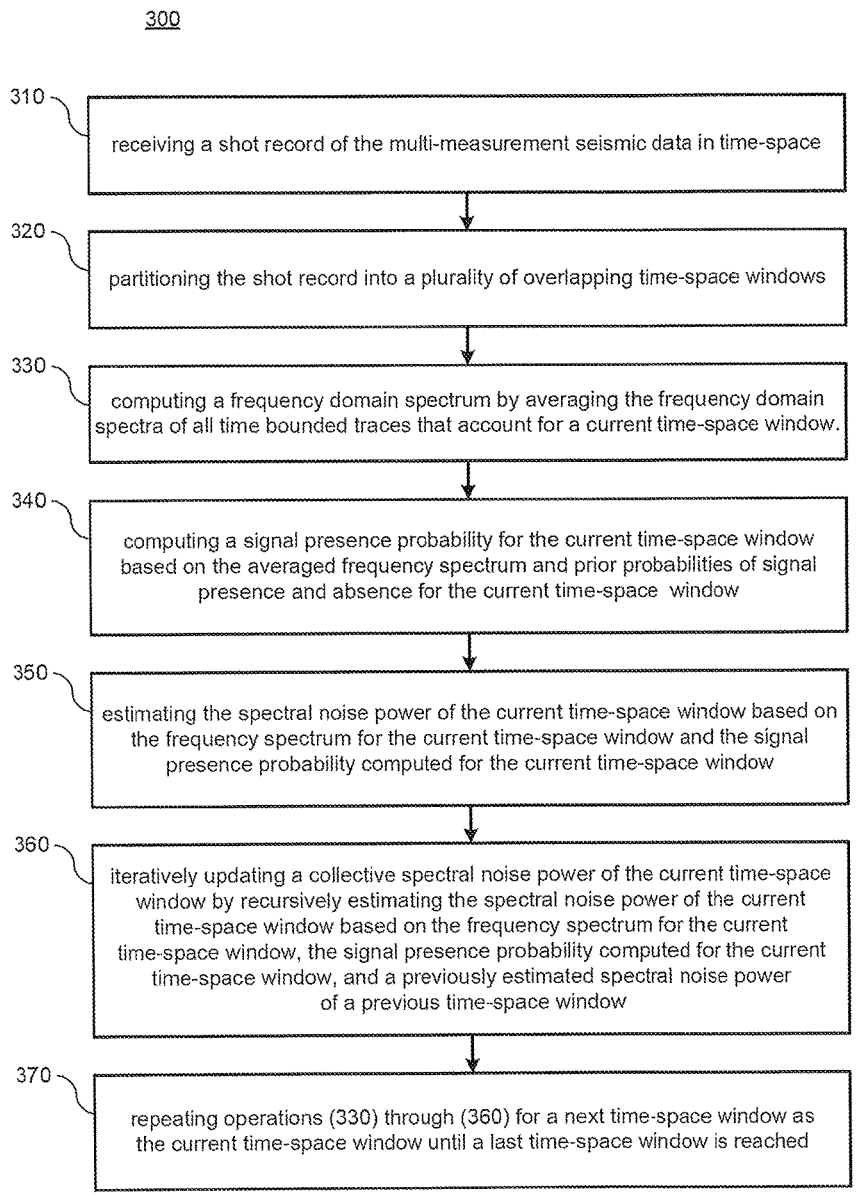
FIG. 3 illustrates a diagram of a method for estimating a noise model in multi-measurement data that was acquired using multi-dimensional seismic sensor arrays in accordance with implementations of various techniques described herein.

FIG. 3 illustrates a diagram of a method for estimating a noise model in multi-measurement data that was acquired using multi-dimensional seismic sensor arrays in accordance with implementations of various techniques described herein. It should be understood that while method 300 indicates a particular order of execution of operations, in some instances, certain portions of the operations may be executed in a different order, and on different systems. Further, in some other instances, additional operations or steps may be added to method 300. Similarly, some operations or steps may be omitted.

Figure 4:
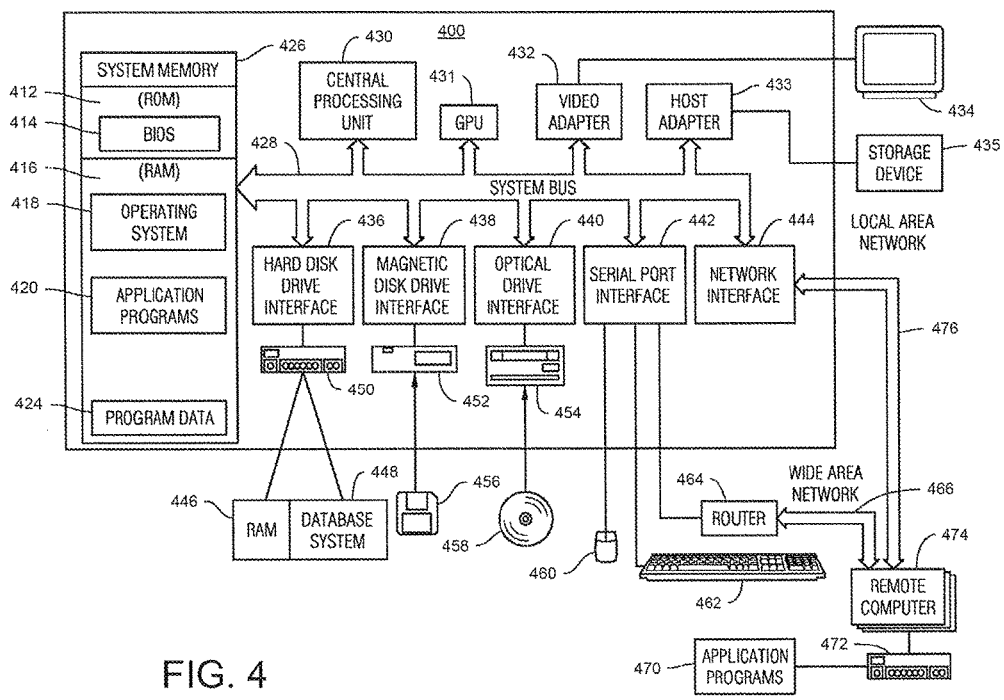
FIG. 4 illustrates a computing system in accordance with implementations of various techniques described herein.

In various implementations, method 300 may be performed and/or executed by various types of computing devices, such as, e.g., computing device 400 of FIG. 4. As described herein below, the computing device 400 may use various hardware, software, peripheral components and/or devices, and related processing capabilities to estimate a spectral noise power (or noise model) of multi-measurement seismic data received from a multi-dimensional seismic sensor array having multiple seismic sensors.

At block 310, method 300 may receive a shot record of the multi-measurement seismic data in time-domain. At block 320, method 300 may partition the shot record into a plurality of overlapping time-space windows. At block 330, method 300 may compute a frequency-domain spectrum for a current time-space window. In some implementations, this may include computing a frequency domain spectrum by averaging the frequency domain spectra of the time bounded traces that account for a current time-space window. At block 340, method 300 may compute a signal presence probability for the current time-space window based on the frequency-domain spectrum and prior probabilities of signal presence and absence for the current time-space window. In some implementations, this may include computing a signal presence probability for the current time-space window based on the averaged frequency spectrum and prior probabilities of signal presence and absence for the current time-space window. At block 350, method 300 may estimate the spectral noise power of the current time-space window based on the frequency spectrum for the current time-space window and the signal presence probability computed for the current time-space window. At block 360, method 300 may iteratively update a collective spectral noise power of the current time-space window by recursively estimating the spectral noise power of the current time-space window based on the frequency spectrum for the current time-space window, the signal presence probability computed for the current time-space window, and a previously estimated spectral noise power of a previous time-space window. At block 370, method 300 may repeat operations (330) through (360) for a next time-space window as the current time-space window until a last time-space window is reached. In some implementations, this may include repeating operations 330-360 for the overlapping windows for a common spatial window range, and then moving to a next common spatial window range and so on until the overlapping windows have been processed.

Computing System

Implementations of various technologies described herein may be operational with numerous general purpose or special purpose computing system environments or configurations. Examples of well known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, smartphones, smartwatches, personal wearable computing systems networked with other computing systems, tablet computers, and distributed computing environments that include any of the above systems or devices, and the like.

The various technologies described herein may be implemented in the general context of computer-executable instructions, such as program modules, being executed by a computer. Generally, program modules include routines, programs, objects, components, data structures, etc. that performs particular tasks or implement particular abstract data types. While program modules may execute on a single computing system, it should be appreciated that, in some implementations, program modules may be implemented on separate computing systems or devices adapted to communicate with one another. A program module may also be some combination of hardware and software where particular tasks performed by the program module may be done either through hardware, software, or both.

The various technologies described herein may also be implemented in distributed computing environments where tasks are performed by remote processing devices that are linked through a communications network, e.g., by hard-wired links, wireless links, or combinations thereof. The distributed computing environments may span multiple continents and multiple vessels, ships or boats. In a distributed computing environment, program modules may be located in both local and remote computer storage media including memory storage devices.

FIG. 4 illustrates a schematic diagram of a computing system 400 in which the various technologies described herein may be incorporated and practiced. In various implementations, the computing system 400 may be implemented as a special purpose machine configured for estimating a spectral noise power of multi-measurement seismic data received from a multi-dimensional seismic sensor array having multiple seismic sensors. The computing system 400 may include various types of computers, including, e.g., server, mainframe, desktop, laptop, tablet, or various other types of computer system configurations may be used to implement marine based applications.

The computing system 400 may include a central processing unit (CPU) 430, a system memory 426, a graphics processing unit (GPU) 431 and a system bus 428 that couples various system components including the system memory 426 to the CPU 430. Although one CPU is illustrated in FIG. 4, it should be understood that in some implementations the computing system 400 may include more than one CPU. The GPU 431 may be a microprocessor specifically designed to manipulate and implement computer graphics. The CPU 430 may offload work to the GPU 431. The GPU 431 may have its own graphics memory, and/or may have access to a portion of the system memory 426. As with the CPU 430, the GPU 431 may include one or more processing units, and the processing units may include one or more cores. The system bus 428 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory 426 may include a read-only memory (ROM) 412 and a random access memory (RAM) 446. A basic input/output system (BIOS) 414, containing the basic routines that help transfer information between elements within the computing system 400, such as during start-up, may be stored in the ROM 412.

The computing system 400 may further include a hard disk drive 450 for reading from and writing to a hard disk, a magnetic disk drive 452 for reading from and writing to a removable magnetic disk 456, and an optical disk drive 454 for reading from and writing to a removable optical disk 458, such as a CD ROM or other optical media. The hard disk drive 450, the magnetic disk drive 452, and the optical disk drive 454 may be connected to the system bus 428 by a hard disk drive interface 456, a magnetic disk drive interface 458, and an optical drive interface 450, respectively. The drives and their associated computer-readable media may provide nonvolatile storage of computer-readable instructions, data structures, program modules and other data for the computing system 400.

Although the computing system 400 is described herein as having a hard disk, a removable magnetic disk 456 and a removable optical disk 458, it should be appreciated by those skilled in the art that the computing system 400 may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 400. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The computing system 400 may also include a host adapter 433 that connects to a storage device 435 via a small computer system interface (SCSI) bus, a Fiber Channel bus, an eSATA bus, or using any other applicable computer bus interface. Combinations of any of the above may also be included within the scope of computer readable media.

A number of program modules may be stored on the hard disk 450, magnetic disk 456, optical disk 458, ROM 412 or RAM 416, including an operating system 418, one or more application programs 420, program data 424, and a database system 448. The application programs 420 may include various mobile applications ("apps") and other applications configured to perform various methods and techniques described herein. The operating system 418 may be any suitable operating system that may control the operation of a networked personal or server computer, such as Windows® XP, Mac OS® X, Unix-variants (e.g., Linux® and BSD®), and the like.

A user may enter commands and information into the computing system 400 through input devices such as a keyboard 462 and pointing device 460. Other input devices may include a microphone, joystick, game pad, satellite dish, scanner, or the like. These and other input devices may be connected to the CPU 430 through a serial port interface 442 coupled to system bus 428, but may be connected by other interfaces, such as a parallel port, game port or a universal serial bus (USB). A monitor 434 or other type of display device may also be connected to system bus 428 via an interface, such as a video adapter 432. In addition to the monitor 434, the computing system 400 may further include other peripheral output devices such as speakers and printers.

Further, the computing system 400 may operate in a networked environment using logical connections to one or more remote computers 474. The logical connections may be any connection that is commonplace in offices, enterprise-wide computer networks, intranets, and the Internet, such as local area network (LAN) 456 and a wide area network (WAN) 466. The remote computers 474 may be another a computer, a server computer, a router, a network PC, a peer device or other common network node, and may include many of the elements describes above relative to the computing system 400. The remote computers 474 may also each include application programs 470 similar to that of the computer action function.

When using a LAN networking environment, the computing system 400 may be connected to the local network 476 through a network interface or adapter 444. When used in a WAN networking environment, the computing system 400 may include a router 464, wireless router or other means for establishing communication over a wide area network 466, such as the Internet. The router 464, which may be internal or external, may be connected to the system bus 428 via the serial port interface 452. In a networked environment, program modules depicted relative to the computing system 400, or portions thereof, may be stored in a remote memory storage device 472. It will be appreciated that the network connections shown are merely examples and other means of establishing a communications link between the computers may be used.

The network interface 444 may also utilize remote access technologies (e.g., Remote Access Service (RAS), Virtual Private Networking (VPN), Secure Socket Layer (SSL), Layer 2 Tunneling (L2T), or any other suitable protocol). These remote access technologies may be implemented in connection with the remote computers 474.

It should be understood that the various technologies described herein may be implemented in connection with hardware, software or a combination of both. Thus, various technologies, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various technologies. In the case of program code execution on programmable computers, the computing device may include a processor, a storage medium readable by the processor (including volatile and non-volatile memory and/or storage elements), at least one input device, and at least one output device. One or more programs that may implement or utilize the various technologies described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations. Also, the program code may execute entirely on a user's computing device, on the user's computing device, as a stand-alone software package, on the user's computer and on a remote computer or entirely on the remote computer or a server computer.

The system computer 400 may be located at a data center remote from the survey region. The system computer 400 may be in communication with the receivers (either directly or via a recording unit, not shown), to receive signals indicative of the reflected seismic energy. These signals, after conventional formatting and other initial processing, may be stored by the system computer 400 as digital data in the disk storage for subsequent retrieval and processing in the manner described above. In one implementation, these signals and data may be sent to the system computer 400 directly from sensors, such as geophones, hydrophones and the like. When receiving data directly from the sensors, the system computer 400 may be described as part of an in-field data processing system. In another implementation, the system computer 400 may process seismic data already stored in the disk storage. When processing data stored in the disk storage, the system computer 400 may be described as part of a remote data processing center, separate from data acquisition. The system computer 400 may be configured to process data as part of the in-field data processing system, the remote data processing system or a combination thereof.

Those with skill in the art will appreciate that any of the listed architectures, features or standards discussed above with respect to the example computing system 400 may be omitted for use with a computing system used in accordance with the various embodiments disclosed herein because technology and standards continue to evolve over time.

Of course, many processing techniques for collected data, including one or more of the techniques and methods disclosed herein, may also be used successfully with collected data types other than seismic data. While certain implementations have been disclosed in the context of seismic data collection and processing, those with skill in the art will recognize that one or more of the methods, techniques, and computing systems disclosed herein can be applied in many fields and contexts where data involving structures arrayed in a three-dimensional space and/or subsurface region of interest may be collected and processed, e.g., medical imaging techniques such as tomography, ultrasound, MRI and the like for human tissue; radar, sonar, and LIDAR imaging techniques; and other appropriate three-dimensional imaging problems.

While the foregoing is directed to implementations of various technologies described herein, other and further implementations may be devised without departing from the basic scope thereof. Although the subject matter has been described in language specific to structural features and/or methodological acts, it is to be understood that the subject matter defined in the appended claims is not limited to the specific features or acts described above. Rather, the specific features and acts described above are disclosed as example forms of implementing the claims.

What is claimed is:

1. A method, implemented by a computing system, that improves a seismic imaging process that facilitates hydrocarbon exploration via estimating a spectral noise power of multi-measurement seismic data received from a multi-dimensional seismic sensor array having multiple seismic sensors, the method comprising:
    via the computing system, receiving a shot record of the multi-measurement seismic data in time-domain;
    via the computing system, partitioning the shot record into a plurality of overlapping time-space windows;
    via the computing system, computing a frequency-domain spectrum for each time-space window;
    via the computing system, computing a signal presence probability for each time-space window using the frequency-domain spectrum and prior probabilities of signal presence and absence for each time-space window;
    via the computing system, iteratively updating a collective spectral noise power by recursively estimating the spectral noise power of a current time-space window based on the frequency-domain spectrum for the current time-space window, the signal presence probability computed for the current time-space window, and a previously estimated spectral noise power of a previous time-space window; and
    via the computing system, based at least in part on the recursively estimating the spectral noise power, processing at least a portion of the multi-measurement seismic data as part of a seismic imaging process that facilitates hydrocarbon exploration.

2. The method of claim 1, wherein the multi-measurement seismic data comprises stationary noise and non-stationary noise, and wherein estimating the spectral noise power comprises estimating the spectral noise power of the stationary noise and non-stationary noise in the multi-measurement seismic data.

3. The method of claim 1, wherein the multi-dimensional seismic sensor array is coupled to a streamer that is towed by a marine vessel, and wherein the multiple seismic sensors are coupled to the streamer at intervals along the streamer.

4. The method of claim 1, wherein the multiple seismic sensors comprise a hydrophone, a first accelerometer configured in an x-coordinate direction, a second accelerometer configured in a y-coordinate direction, and a third accelerometer configured in a z-coordinate direction.

5. The method of claim 1, wherein the shot record of the multi-measurement seismic data includes a combination of up-going and down-going wavefield data along with pressure noise data reflected from geological formations.

6. The method of claim 1, wherein partitioning the shot record into a plurality of overlapping time-space windows comprises partitioning the shot record into a plurality of columns, wherein each column comprises a columnar series of overlapping time-space windows, and wherein each column is offset from each other column by at least one time-space window.

7. The method of claim 1, wherein computing the frequency-domain spectrum for each time-space window comprises transforming each time-space window into a frequency-domain window using a Fast Fourier Transform (FFT).

8. The method of claim 1, wherein the prior probabilities of signal presence and absence for each time-space window refer to respective likelihood functions of the multi-measurement seismic data in case of signal presence and absence.

9. The method of claim 1, further comprising deriving an initial spectral noise power that is estimated from a time-space window having the least signal-to-noise ratio (SNR) when compared to other time-space windows, wherein the initial spectral noise power is used for recursively estimating the spectral noise power of the current time-space window.

10. The method of claim 1, further comprising estimating the spectral noise power of the previous time-space window based on the frequency-domain spectrum for the previous time-space window and the signal presence probability computed for the previous time-space window.

11. The method of claim 1, wherein recursively estimating the spectral noise power comprises recursively estimating signal-to-noise ratio (SNR).

12. The method of claim 1, wherein computing the signal presence probability is based on a Bayesian framework for each time-space window using the frequency-domain spectrum and prior probabilities of signal presence and absence for each time-space window.

13. A device that improves a seismic imaging process that facilitates hydrocarbon exploration via estimation of a spectral noise power of multi-measurement seismic data received from a multi-dimensional seismic sensor array having multiple seismic sensors, the device comprising:
    a processor; and
    memory having instructions stored thereon that, when executed by the processor, cause the processor to:
        receive a shot record of the multi-measurement seismic data in time-domain;

partition the shot record into a plurality of overlapping time-space windows;

compute a frequency-domain spectrum for each time-space window;

compute a signal presence probability for each time-space window based on the frequency-domain spectrum computed for each time-space window and previous information computed for a previous time-space window;

estimate the spectral noise power of the current time-space window based on the frequency-domain spectrum for the current time-space window, the signal presence probability computed for the current time-space window, and a previously estimated spectral noise power computed for the previous time-space window; and based at least in part on the estimate of the spectral power noise, process at least a portion of the multi-measurement seismic data as part of a seismic imaging process that facilitates hydrocarbon exploration.

14. The device of claim 13, wherein the memory further comprises instructions that cause the processor to iteratively update the spectral noise power by recursively estimating the spectral noise power of one or more next time-space windows based on the frequency-domain spectrum for the one or more next time-space windows, the signal presence probability computed for the one or more next time-space windows, and the previously estimated spectral noise power of the previous time-space window.

15. The device of claim 13, wherein the multi-measurement seismic data comprises stationary noise and non-stationary noise, and wherein estimating the spectral noise power comprises estimating the spectral noise power of the stationary noise and non-stationary noise in the multi-measurement seismic data.

16. The device of claim 13, wherein computing the frequency-domain spectrum for each time-space window comprises transforming each time-space window into a frequency-domain window using a Fast Fourier Transform (FFT).

17. A non-transitory computer-readable medium having stored thereon a plurality of computer-executable instructions which, when executed by a computer, cause the computer to improve a seismic imaging process that facilitates hydrocarbon exploration via estimation of a spectral noise power of multi-measurement seismic data received from a multi-dimensional seismic sensor array having multiple seismic sensors, wherein the computer-executable instructions that cause the computer to estimate the spectral noise power comprises computer-executable instructions that cause the computer to:

receive a shot record of the multi-measurement seismic data in time-domain;

partition the shot record into a plurality of overlapping time-space windows;

compute a frequency-domain spectrum for a current time-space window;

compute a signal presence probability for the current time-space window based on the frequency-domain spectrum and prior probabilities of signal presence and absence for the current time-space window;

estimate the spectral noise power of the current time-space window based on the frequency-domain spectrum for the current time-space window and the signal presence probability computed for the current time-space window;

iteratively update a collective spectral noise power of the current time-space window by recursive estimation of the spectral noise power of the current time-space window based on the frequency-domain spectrum for the current time-space window, the signal presence probability computed for the current time-space window, and a previously estimated spectral noise power of a previous time-space window; and based at least in part on the recursive estimation of the spectral power noise, process at least a portion of the multi-measurement seismic data as part of a seismic imaging process that facilitates hydrocarbon exploration.

18. The computer-readable medium of claim 17, wherein the multi-dimensional seismic sensor array is coupled to a streamer that is towed by a marine vessel, wherein the multiple seismic sensors are coupled to the streamer at intervals along the streamer, and wherein the multiple seismic sensors comprise a hydrophone, a first accelerometer configured in an x-coordinate direction, a second accelerometer configured in a y-coordinate direction, and a third accelerometer configured in a z-coordinate direction.

19. The computer-readable medium of claim 17, wherein the multi-measurement seismic data comprises stationary noise and non-stationary noise, and wherein the computer-executable instructions that cause the computer to estimate the spectral noise power comprises computer-executable instructions that cause the computer to estimate the spectral noise power of the stationary noise and non-stationary noise in the multi-measurement seismic data.

20. The computer-readable medium of claim 17, wherein the computer-executable instructions that cause the computer to compute the frequency-domain spectrum for each time-space window comprises computer-executable instructions that cause the computer to transform each time-space window into a frequency-domain window using a Fast Fourier Transform (FFT).

* * * * *